(12) United States Patent
Yada

(10) Patent No.: US 6,226,139 B1
(45) Date of Patent: May 1, 2001

(54) CLOCK GENERATOR AND DISK DRIVE

(75) Inventor: Hiroaki Yada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/092,952

(22) Filed: Jun. 8, 1998

Related U.S. Application Data

(63) Continuation of application No. PCT/JP97/03616, filed on Oct. 8, 1996.

(30) Foreign Application Priority Data

Oct. 8, 1996 (JP) .................................................. 8-267589

(51) Int. Cl.⁷ ............................. G11B 5/09; G11B 20/10; G11B 21/10
(52) U.S. Cl. ............................................................ 360/51
(58) Field of Search ................................ 360/51, 46, 61

(56) References Cited

U.S. PATENT DOCUMENTS

| | | | | |
|---|---|---|---|---|
| 5,406,427 | * | 4/1995 | Shimoda | 360/51 |
| 5,526,200 | * | 6/1996 | Yada | 360/51 |
| 5,680,267 | * | 10/1997 | Tanaka et al. | 360/51 |
| 5,786,954 | * | 7/1998 | Yada et al. | 360/51 |

FOREIGN PATENT DOCUMENTS

| | | | |
|---|---|---|---|
| 6-290545 | 10/1994 | (JP) . | |
| 8-069668 | 3/1996 | (JP) . | |
| 8-69668 | * 3/1996 | (JP) | G11B/20/10 |
| 8-279261 | * 10/1996 | (JP) | G11B/21/10 |

OTHER PUBLICATIONS

A Coherent Maximum Likelihood Head Position Estimator for PERM Disk Drives, Hiroaki Yada and Toru Takeda, May 1996.

* cited by examiner

Primary Examiner—Hoa T. Nguyen
Assistant Examiner—Dan I. Davidson
(74) Attorney, Agent, or Firm—Ronald P. Kananen; Rader, Fishman & Grauer

(57) ABSTRACT

A clock generator applicable to a sample servo type magnetic disk drive is disclosed. Reproduced signals z(t) from a clock pattern are digitized by an A/D converter (33) before being fed to a phase comparator (52). An arithmetic unit (61) calculates an inner product of N sampled values and N weighting factors in a linear combination, and a D flip-flop (62) provides a phase comparison error signal f(θ). The signal f(θ) is converted by a D/A converter (53) to analog format before being supplied as a control signal to a VCO (51) via a loop filter (54). A clock signal CLK from the VCO (51) is controlled in phase so as to generate a clock signal CLK synchronized with the reproduced signals z(t). When the weighting factors are arranged so that their total sum becomes zero, the signal f(θ) is free from adverse effects of DC elements superposed on the reproduced signals z(t), whereby a clock signal CLK in precise synchronism with the reproduced signal z(t) is obtained.

11 Claims, 13 Drawing Sheets

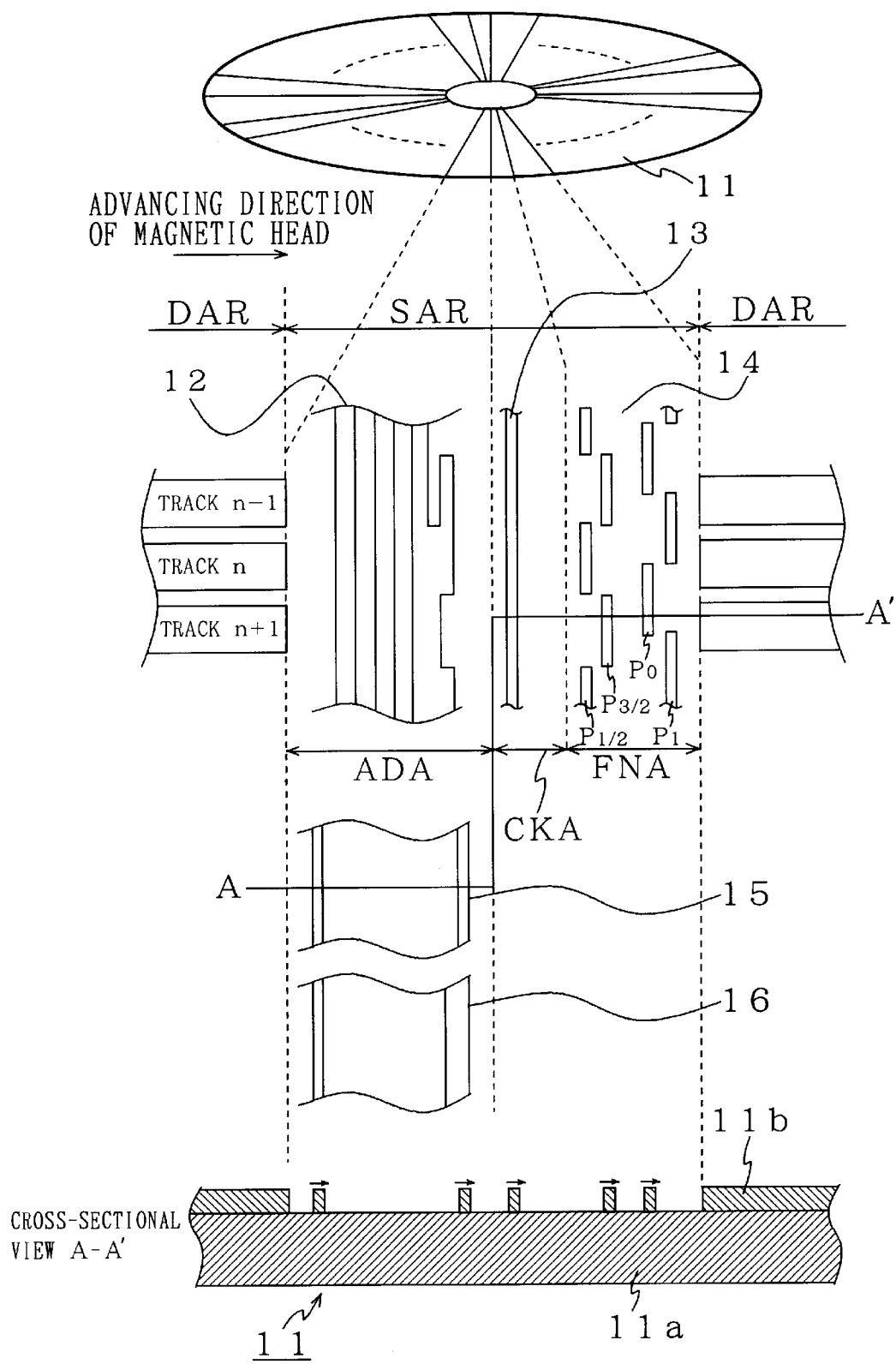

[CONDITIONS]
MEAN PROCESS COUNT : 200
HALF-WIDTH OF ISOLATED WAVE : 100 ns
BUMP LENGTH : 200 ns
$S_{o-P}/N_{rms}$ : 26 dB
TOTAL FACTOR COUNT : N = 11
Ts : 25 ns

CLOCK GENERATOR AND DISK DRIVE

This application is a continuation of PCT application PCT/JP97/03616 filed Oct. 8, 1996.

TECHNICAL FIELD

The present invention relates to a clock generator and a disk driver adapted advantageously to such devices as a sample servo type magnetic disk drive.

BACKGROUND ART

Sample servo type magnetic disk drives generate a clock signal based on a reproduced signal from clock patterns. The clock signal provides timing information for detecting head position servo information from the surface of a magnetic disk. The clock patterns are contained in servo areas arranged discretely and equal distances apart on concentric recording tracks of the magnetic disk surface.

For a phase-locked loop (PLL) by which to generate the clock signal, the applicant of this invention previously proposed a linear combination type phase comparator (Japanese Patent Laid-Open No. Hei 6-290545) that provides linear combinations of sampled values from clock pattern-reproduced signals as the result of phase comparison. FIGS. 16A, 16B and 16C sketch the operating principle of the proposed phase comparator. FIG. 16A shows a case in which a clock signal lags a clock pattern in terms of phase, FIG. 16B depicts a case where the clock pattern and the clock signal match in phase, and FIG. 16C indicates a case in which the clock signal leads the clock pattern in phase.

A phase comparison output $P_k$ is obtained by adding two values. One of the values is acquired by multiplying by a weighting factor $C_0$ a sampled value $S_{k-1}$ of a reproduced isolated waveform from one edge in the clock pattern in effect when the time $t=(k-1)T$; the other value is obtained by multiplying by a weighting factor C1 a sampled value $S_{k+1}$ of the same reproduced isolated waveform in effect when the time $t=(k+1)T$. Because the reproduced isolated waveform from one clock pattern edge is substantially symmetrical, $C_0=1$ and $C1=-1$.

If a peak of the reproduced isolated waveform coincides with a clock phase and if that peak is present when the time $T=kT$, then the sampled values $S_{k-1}$ and $S_{k+1}$ are substantially the same and the phase comparison output $P_k$ is zero (see FIG. 16B). If there exists a phase difference, with the peak of the reproduced isolated waveform failing to match the clock phase, then the phase comparison output $P_k$ is not zero (see FIGS. 16A and 16C).

Besides the above two sampled values, more sampled values from the reproduced isolated waveform of the clock pattern may be used to acquire the phase comparison output. For further improvements, this applicant also proposed a maximum likelihood phase comparator (Japanese Patent Laid-Open No. Hei 8-69668) which has weighting factors for linear combinations approximately equalized to sampled values of a differential waveform of a clock pattern-reproduced signal, whereby phase comparison accuracy levels close to theoretical limits are obtained.

Where a reproduced isolated waveform from a clock pattern has a steep gradient, level changes in sampled values with respect to phase changes are pronounced. This minimizes the adverse effects of noise and allows any phase difference to be detected efficiently. On the other hand, a differential waveform of the clock pattern has large amplitude levels where the gradient of the reproduced isolated waveform is steep. This allows the phase comparison output to be acquired with high precision when the weighting factors for linear combinations are made substantially the same as the sampled values of the differential waveform of the clock pattern-reproduced signal.

Illustratively, sampled values $Z_{k-8}, \ldots Z_k$ of a reproduced isolated waveform from a clock pattern may be used as shown in FIG. 17. In this example, sampled values $C_0, \ldots, C_8$ of a differential waveform of the clock pattern-reproduced signal may be used as weighting factors as depicted in FIG. 18. Here, an inner product is calculated between two vectors, one having elements $(Z_{k-8}, \ldots, Z_k)$ and the other with elements $(C_0, \ldots, C_8)$. This provides phase comparison outputs at high precision levels.

The sample servo type magnetic disk drive typically has 200 servo areas per disk track. Such an enhanced servo sample frequency allows the disk drive to position its head with high precision. The resulting high track density provides a large storage capacity.

In data recording, however, a prolonged switching time from data recording to servo information reproduction can increase useless areas on the magnetic disk. This tends to worsen the effective use of the medium surface and may offset the benefit of the large storage capacity. For example, suppose that there are 200 servo areas per disk track, that the servo sample frequency is about 15 kHz and that the switching time is 1 to 3 $\mu$s. In that case, between two and five percent of the available magnetic disk surface will become useless areas. The switching time is the time required for the internal circuit states (e.g., magnetic head temperature change and head amplifier status change) to stabilize and thus for the DC level of the reproduced signal waveform to stabilize following each recording/reproduction switchover.

The disadvantage of the reduced use of the medium surface has persisted even with the linear combination type phase comparator or maximum likelihood phase comparator proposed earlier by this applicant to implement precise head position detection by use of a clock signal.

It is therefore an object of the present invention to provide a clock generator and a disk drive whereby DC fluctuations in the signal to be compared in terms of phase are prevented from adversely affecting the result of phase comparison.

DISCLOSURE OF INVENTION

In carrying out the invention and according to one aspect thereof, there is provided a clock generator comprising: clock signal generating means for generating a clock signal; sampling means for sampling a phase comparison target signal which is supplied at predetermined timing intervals and which has a first period, in accordance with the clock signal during every second period shorter than the first period, in order to output N sampled values during the first period, N being a natural number; inner product calculating means for calculating an inner product of a signal vector composed of the N sampled values and a factor vector having N weighting factors, so as to output an outcome of the calculation as a phase comparison signal; and phase control means for controlling the clock signal generating means based on the phase comparison signal so that the phase comparison target signal and the clock signal will match in phase; wherein the total sum of the N sampled factors is substantially zero.

According to another aspect of the invention, there is provided a disk drive for driving a disk type storage medium on which a reference pattern for clock signal generation is recorded predetermined distances apart, the disk drive comprising: access means for reproducing a signal recorded on the disk type storage medium in order to output a reproduced signal; clock signal generating means for generating a clock signal; sampling means for sampling that reproduced signal from the reference pattern which is included in each of predetermined timing intervals and which has a first period, in accordance with the clock signal during a second period shorter than the first period, in order to output N sampled values, N being a natural number; inner product calculating means for calculating an inner product of a signal vector composed of the N sampled values and a factor vector having N weighting factors, so as to output an outcome of the calculation as a phase comparison signal; and phase control means for controlling the clock signal generating means based on the phase comparison signal so that the reproduced signal from the reference pattern and the clock signal will match in phase; wherein the total sum of the N sampled factors for the inner product calculating means is substantially zero.

According to the invention, the phase comparison target signal is sampled in accordance with the clock signal, and a signal vector composed of N sampled values is prepared. An inner product of that signal vector and of a factor vector having N weighting factors whose total sum is substantially zero is calculated. Calculating the inner product provides a phase comparison signal. Because the total sum of the N weighting factors is approximately zero, the effect of any DC fluctuations in the phase comparison target signal on the phase comparison signal is minimized. Freed from the DC fluctuations in the phase comparison target signal, the clock signal generated by the clock signal generating means is precisely in phase with the phase comparison target signal.

The disk drive handles a disk type storage medium that records a reference pattern for generating a clock signal in areas independent of data recorded areas. In recording mode, a switchover from recording to reproduction takes place upon transition from a data recorded area to a servo area. The switchover conventionally necessitates a switching time required for the DC level of the reproduced signal to stabilize as mentioned above. Under the inventive scheme to minimize the DC fluctuations in the phase comparison target signal, a clock signal is acquired in precise synchronism with a reference pattern-reproduced signal independently of such DC fluctuations. This eliminates the need for the switching time it conventionally takes for the DC level of the reproduced signal to fully stabilize. Reproduction of servo information can then be started immediately after the switchover from recording to reproduction.

BRIEF DESCRIPTION OF DRAWINGS

FIG. 1 is a schematic view of a magnetic disk for use with the best mode for carrying out this invention;

BEST MODE FOR CARRYING OUT THE INVENTION

Figure 2A:
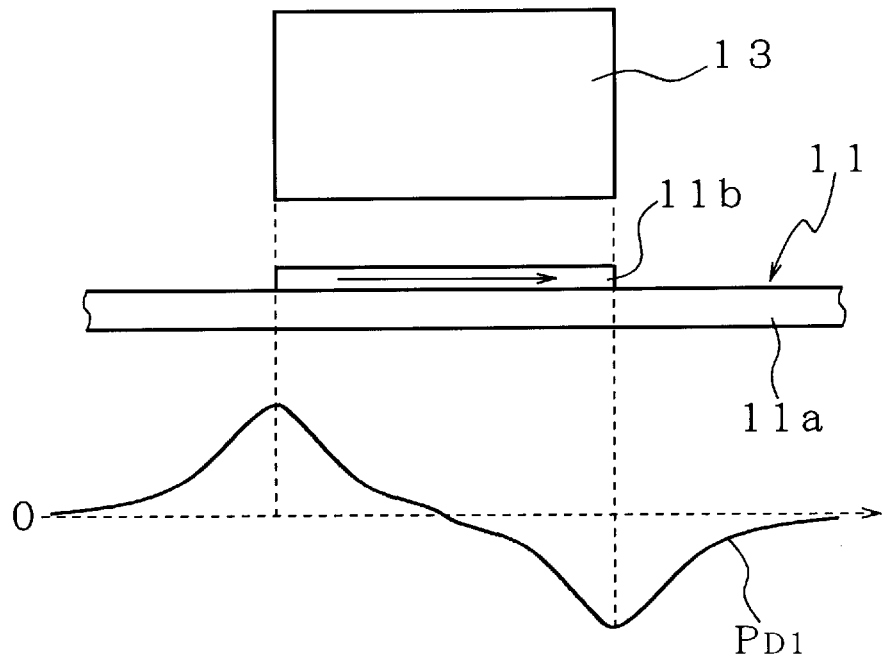
FIGS. 2A and 2B are schematic views of dipulses obtained from a clock pattern.

FIG. 1 shows a sample servo type magnetic disk 11 for use with the best mode for carrying out this invention. On the magnetic disk 11, a plurality of servo areas SAR are formed to divide data areas DAR, arranged equal distances apart. There are illustratively 200 servo SAR per track.

The data areas DAR accommodate data in units called sectors of 512 bytes each. The data recorded in each sector is supplemented by a sector ID (sector identification code) and ECC (error correcting code). In addition to a head number (specifying one of a plurality of heads), a track number and a sector number, each sector ID may include information indicating the unavailability of the sector in question because of a defect.

Each servo area SAR comprises an address area ADA, a clock area CKA and a fine area FNA.

The address area ADA has an address pattern (track address code) 12 recorded therein. The address pattern 12 is needed in track seek mode where the magnetic head is moved by a servo positioning operation to a target track. The address pattern 12 is made of a gray code having a pattern variable in length and layout so that the track address will vary from one track to another.

The clock area CKA has a clock pattern 13 recorded therein in a radially continuous manner as a timing reference pattern for clock signal generation. In this case, the timings of, say, peak values in a reproduced isolated waveform from the clock pattern 13 provide the data and servo systems with clock information synchronized with the revolutions of the magnetic disk 11.

The fine area FNA has fine patterns 14 recorded therein. The fine patterns 14 are needed in tracking mode where the magnetic head is precisely positioned by a servo positioning operation to the center of a target track. The fine patterns designate the relative position of the magnetic head with respect to tracks.

The fine patterns 14 in the fine area comprise first through fourth phase fine patterns $P_0$, $P_{1/2}$, $P_1$ and $P_{3/2}$, each pattern being displaced by a ½ track pitch from the adjacent pattern in the radial direction of the disk, i.e., each phase differing by 90 degrees from the adjacent one. In this arrangement, the width of the fine patterns $P_0$, $P_{1/2}$, $P_1$ and $P_{3/2}$ in the radial direction is made equal to the track pitch Tp. Each center of the first and of the third phase fine patterns $P_0$ and $P_1$ is located between two adjacent tracks. Each center of the second and of the fourth phase fine patterns $P_{1/2}$ and $P_{3/2}$ is located at the center of the respective tracks.

Figure 3:
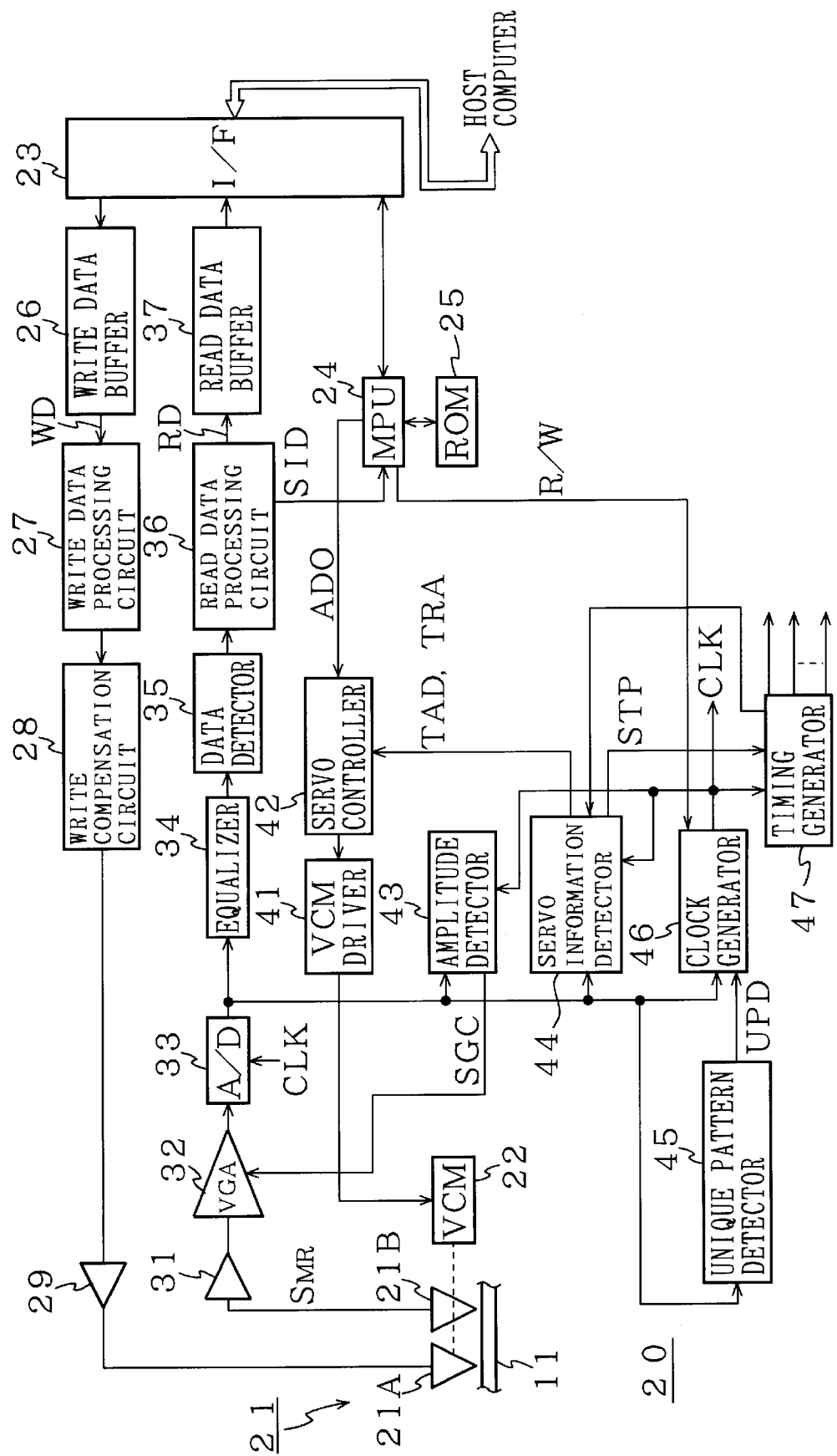
FIG. 3 is a block diagram of a sample servo type magnetic disk drive practiced as the best mode for carrying out the invention.

Synchronism with the clock pattern 13 is provided by a clock generator 46 shown in FIG. 3. Before a unique pattern detection signal UPD is supplied and synchronism is established, it is necessary to seek an approximate position of the clock pattern 13 in question. For that purpose, unique patterns 15 are provided as auxiliary patterns for synchronization. Illustratively, the address patterns 12 in the address areas ADA are replaced by dozens of unique patterns 15 located at predetermined intervals per track. The unique patterns 15 are a combination of a plurality of lines (i.e., patterns) provided in a radially continuous manner. As such, the unique patterns 15 are easy to detect even before an in-phase clock signal is generated. These patterns are typically constituted by violation codes that will not appear in coded data sequences.

In place of the address patterns 12, one home index pattern 16 may be recorded per track. The home index pattern 16 serves as the origin of rotation according to which the rotating direction of the magnetic disk 11 is known. After initial synchronism is established, detection of the home index pattern 16 is awaited (for a single track at the longest) so as to find the rotated position of the magnetic disk 11 (the position accessed by the magnetic head). With the home index pattern 16 detected, data recording or reproduction mode is entered.

The magnetic disk 11 is made of a disk substrate 11a and a magnetic layer 11b. Servo information is recorded in the servo areas SAR of the magnetic disk 11 in one of two methods described below. The first method involves having the magnetic layer partially removed from the plane substrate by etching or like techniques in accordance with servo information; the remaining magnetic layer is DC-magnetized unidirectionally by the magnetic head or the like. The second method involves forming a magnetic layer on a substrate having bumps and depressions previously formed over its entire surface in accordance with servo information, the bumps and depressions being DC-magnetized in the opposite directions.

A cross-sectional view A-A' included in FIG. 1 shows a cross section of the magnetic disk 11 on which servo information is recorded by the first method above. Arrows over the magnetic layer 11b of the servo areas indicate the direction of magnetization.

Figure 2B:
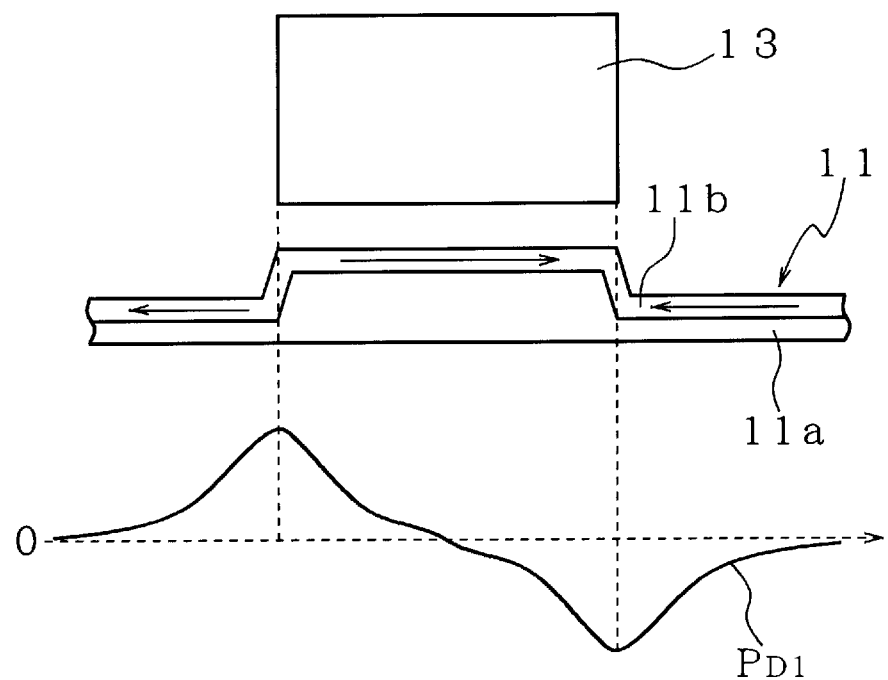

When a magnetic head, not shown, reproduces the patterns recorded in the servo areas SAR, isolated waveforms are reproduced from the leading and trailing edges of each pattern. The two waveforms combine to form what is known as a dipulse $P_{D1}$. FIGS. 2A and 2B illustrate the dipulse $P_{D1}$ obtained from the clock pattern 13. FIG. 2A shows a case of a clock pattern 13 from the magnetic disk 11 on which servo information is recorded by the first method, while FIG. 2B applies to a clock pattern 13 from the magnetic disk 11 on which servo information is recorded by the second method above. Arrows in the magnetic layer 11b in FIGS. 2A and 2B indicate the directions of magnetization.

FIG. 3 is a block diagram of a sample servo type magnetic disk drive 20 practiced as the best mode for carrying out the present invention.

The magnetic disk drive 20 comprises an inductive type head 21A for writing data to data areas DAR on the magnetic disk 11, and a magneto-resistive effect type (MR) head 21B by which to read data from data areas DAR and servo areas SAR. Illustratively, the heads 21A and 21B are integrally formed as a combined head 21.

The combined head 21 (not shown) is mounted on a floating slider (not shown) attached to the tip of a suspension (not shown) which in turn is fixed to one end of a pivot-arm combination (not shown) of which the other end is freely rotatable. The suspension is used to provide loads on the floating slider. One end of the arm is equipped with a voice coil motor (VCM) 22 that serves as a driving motor. The floating slider is designed to float at a predetermined distance off the surface of the magnetic disk 11 when the latter rotates at a constant velocity.

The magnetic disk drive 20 has an interface unit 23 to interface with a host computer, a microprocessor (MPU) 24 that controls the disk drive as a whole, and a ROM (read-only memory) 25 accommodating operation programs for the microprocessor 24 and other information. In this setup, write and read commands coming from the host computer (not shown) are fed to the microcomputer 24 through the interface unit 23.

The magnetic disk drive 20 also includes a write data buffer 26 and a write data processing circuit 27. The write data buffer 26 temporarily holds write data WD sent from the host computer via the interface unit 23. The write data processing circuit 27 adds error correcting code to and digitally modulates the write data WD retrieved from the buffer 26 in the same timing as that for recording data to the magnetic disk, whereby recording data is prepared. Digital modulation is provided typically by the MFM (modified frequency modulation) method or RLL (run length limited) method.

The magnetic disk drive 20 further comprises a write compensation circuit 28 that subjects the recording data from the data processing circuit 27 to write compensation, and a recording amplifier 29 that supplies the inductive type head 21A with a recording current signal representing the output data from the compensation circuit 28. The compensation circuit 28 finely compensates the magnetization reversal timing at write time in consideration of a read signal peak shift attributable to magnetization reversal interference that may occur during high-density recording.

The magnetic disk drive 20 further includes a reproduction amplifier 31, a variable gain amplifier 32, an A/D (analog-to-digital) converter 33, and an equalizer 34. The reproduction amplifier 31, used at read time, amplifies a signal $S_{MR}$ reproduced by the MR type head 21B from the magnetic disk 11. The variable gain amplifier 32 adjusts the level of the output signal of the reproduction amplifier 31. The A/D converter 33 converts the output signal of the variable gain amplifier 32 to a digital signal. The equalizer 34 subjects to waveform equalization the output signal of the A/D converter 33 by use of an FIR (finite impulse response) filter or the like.

The magnetic disk drive 20 also comprises a data detector 35, a read data processing circuit 36 and a read data buffer 37. The data detector 35 detects reproduced data from the output signal of the equalizer 34. The read data processing circuit 36 subjects the reproduced data detected by the data detector 35 to digital demodulation and error correction so as to acquire read data RD. The read data buffer 37 temporarily holds the read data RD output by the read data processing circuit 36. The read data processing circuit 36 also extracts from the read data the sector ID mentioned above. The extracted sector ID is supplied to the microprocessor 24.

The magnetic disk drive 20 further comprises a VCM driver 41, a servo controller 42, an amplitude detector 43 and a servo information detector 44. The VCM driver 41 drives the voice coil motor 22. The servo controller 42 controls the VCM driver 41 so as to position the heads 21A and 21B onto a target track on the magnetic disk 11. The amplitude detector 43 detects a signal amplitude from the output signal of the A/D converter 33 and supplies the variable gain amplifier 32 with a gain control signal SGC accordingly. The servo information detector 44 detects servo information from the output signal of the A/D converter 33.

The servo controller 42 is supplied with track address information TAD and tracking information (fine position signal) TRA obtained by the servo information detector 44. At write time or read time, the servo controller 42 is also fed with target track address information AD0 from the microprocessor 24.

The servo information detector 44 detects track address information TAD based on a reproduced signal from the address pattern 12, and detects tracking information TRA on the basis of a reproduced signal from the fine patterns 14. The tracking information TRA is generated illustratively as follows: given the output signal of the A/D converter 33, the servo information detector 44 first detects amplitudes $F_{1/2}$, $F_{3/2}$, $F_0$ and $F_1$ of reproduced signals from the fine patterns $P_{1/2}$, $P_{3/2}$, $P_0$ and $P_1$, respectively. Subtracting the amplitude $F_1$ from the amplitude $F_0$ provides a subtracted signal $(F_0-F_1)$. The servo information detector 44 then modifies the level and positive-negative sign of the subtracted signal $(F_0-F_1)$, thereby generating the tracking information TRA.

Figure 4:
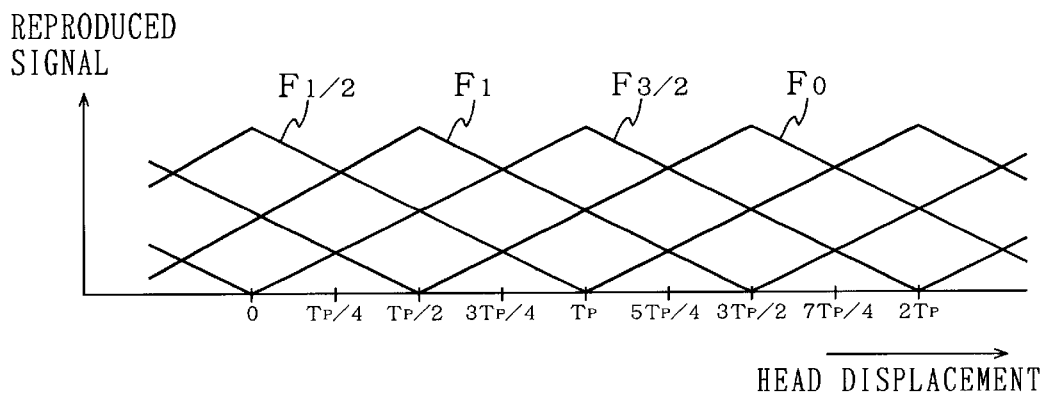
FIG. 4 is a graphic representation showing relations between head displacements on the one hand and reproduced signals from first through fourth phase fine patterns on the other hand.
Figure 5:
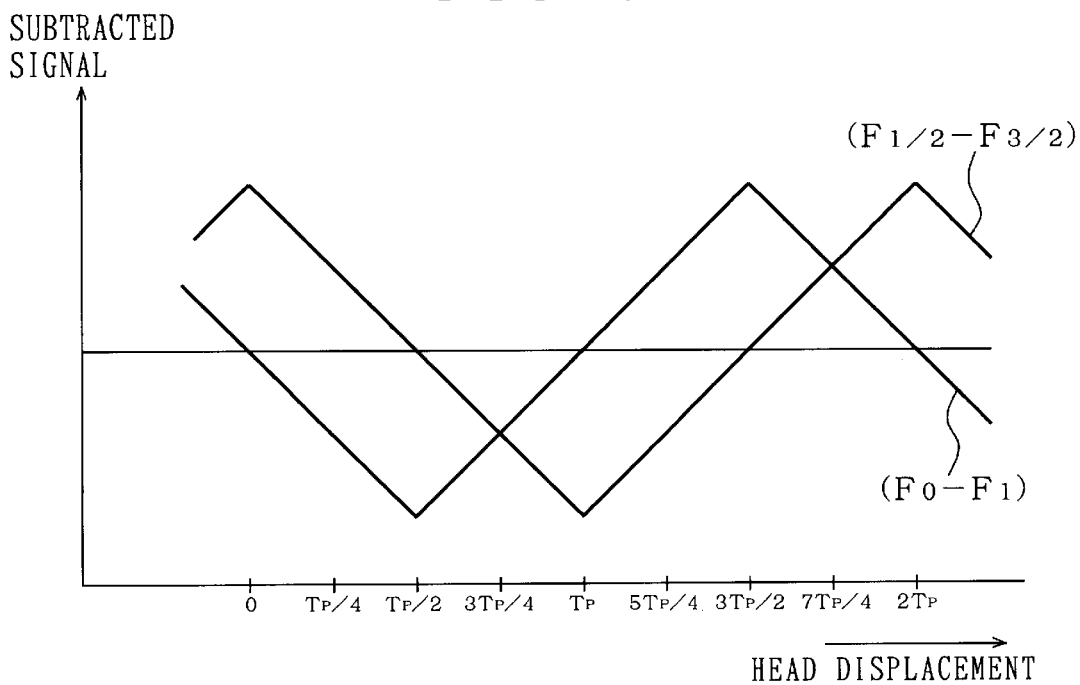
FIG. 5 is a graphic representation showing relations between head displacements on the one hand, and a subtracted signal of reproduced signal from first and a third phase fine patterns and another subtracted signal of a reproduced signal from second and fourth phase fine patterns on the other hand.
Figure 6:
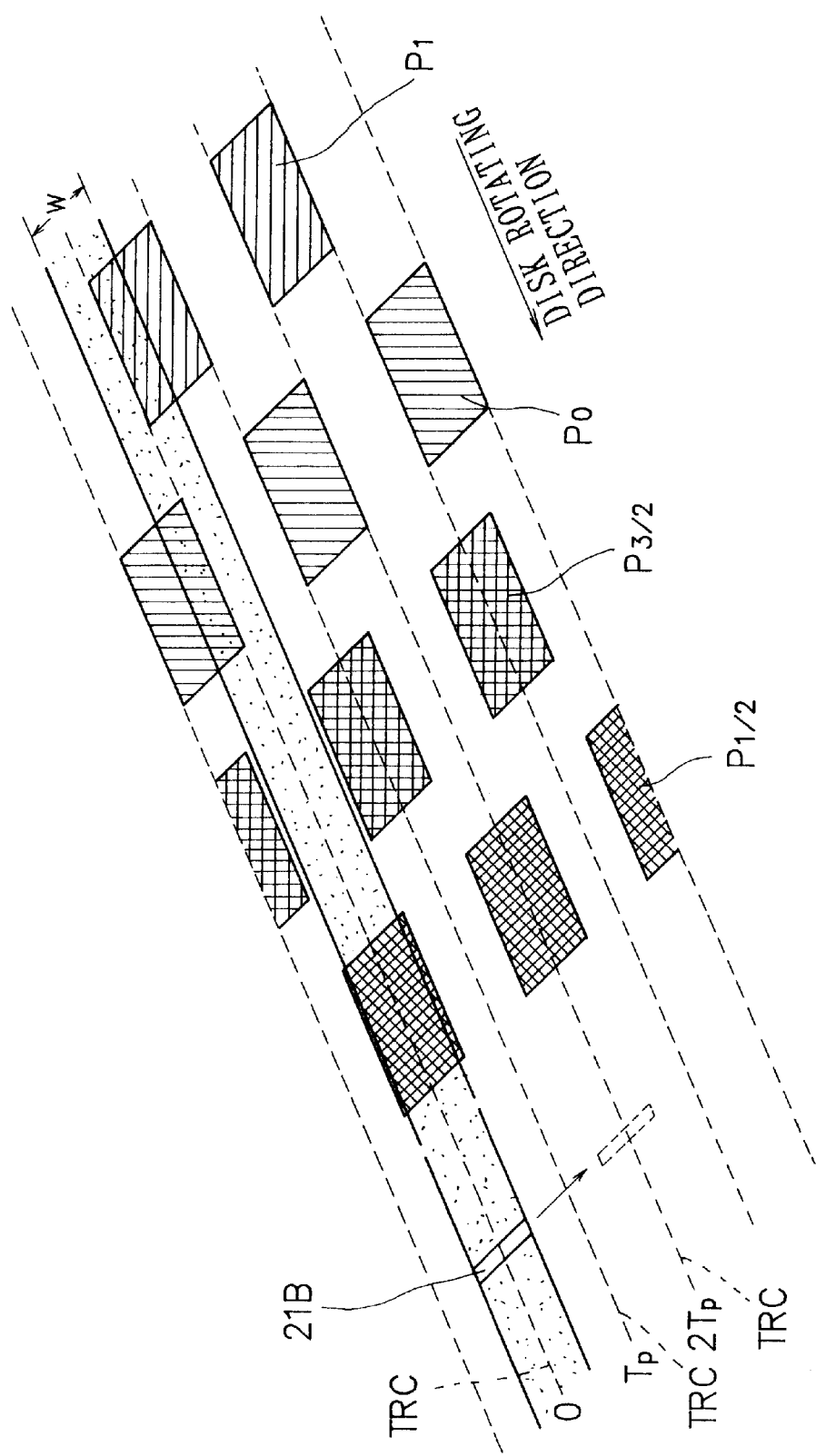
FIG. 6 is a schematic view showing positional relations between fine patterns and a magneto-resistive effect type head (MR type head)

FIG. 4 shows signals $F_0$, $F_1$, $F_{1/2}$ and $F_{3/2}$ reproduced respectively from the fine patterns $P_0$, $P_1$, $P_{1/2}$ and $P_{3/2}$ when the MR type head 21B is moved radially on the magnetic disk 11 as depicted in FIG. 6. FIG. 5 illustrates subtracted signals $(F_0-F_1)$ and $(F_{1/2}-F_{3/2})$. For purpose of simplification and illustration, the signals shown in FIGS. 4 and 5 are those in effect when the width "w" of the MR type head 21B coincides with the track pitch Tp. In FIG. 6; reference characters TRC represent a track center.

The relationship between the positive-negative sign of the subtracted signal $(F_0-F_1)$ and the displacement direction of the magnetic head 21B is reversed from one track to another. However, because the subtracted signal $(F_{1/2}-F_{3/2})$ also has its sign reversed per track, utilizing this signal affords modifications to keep the relationship constant between the positive-negative sign of the subtracted signal $(F_0-F_1)$ and the displacement direction of the magnetic head 21B from one track to the next.

The magnetic disk drive 20 further includes a unique pattern detector 45, a clock generator 46 and a timing generator 47. The unique pattern detector 45 detects unique patterns 15. The clock generator 46 generates a clock signal CLK in synchronism with the revolutions of the magnetic disk 11. The timing generator 47 generates a timing signal by which to pinpoint diverse information locations on the magnetic disk 11.

The clock generator 46 generates the clock signal CLK synchronized with a reproduced signal from the clock pattern 13. The clock generator 46 is supplied with the unique pattern detection signal UPD from the unique pattern detector 45 and with a one-bit mode signal R/W from the microprocessor 24 indicating either write or read mode is in effect. The clock signal CLK thus generated by the clock generator 46 is fed to the amplitude detector 43, servo information detector 44 and timing generator 47.

Besides being fed with the-clock signal CLK from the clock generator 46 as described, the timing generator 47 receives from the servo information detector 44 a signal STP designating the position of origin obtained upon detection of the home index pattern 11 shown in FIG. 1. The timing generator 47 counts the number of clock pulses from the origin and generates various timing signals on the basis of such counts.

Figure 7:
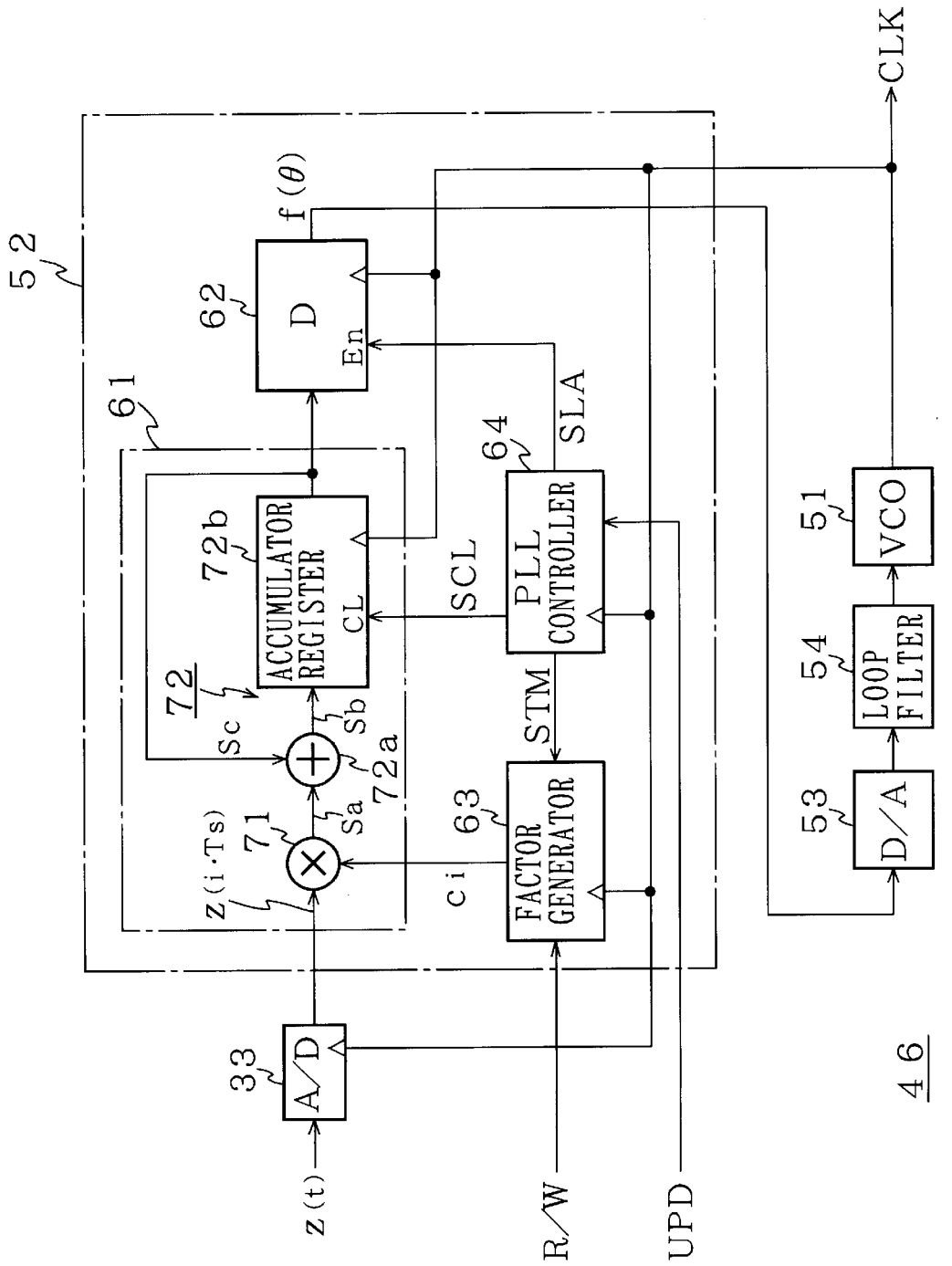
FIG. 7 is a block diagram of a clock generator constituting part of the magnetic disk drive.

FIG. 7 depicts a typical constitution of the clock generator 46. This clock generator 46 is constituted by a digital PLL (phase-locked loop) that employs a linear combination type phase comparator.

The clock generator 46 includes a voltage controlled oscillator (VCO) 51, a phase comparator 52, a D/A (digital-to-analog) converter 53, and a loop filter 54. The voltage controlled oscillator 51 outputs the clock signal CLK when receiving the output signal of the loop filter 54 (to be described later) as a control signal. The phase comparator 52 compares in phase the reproduced signal from the clock pattern 13 with the clock signal CLK. The D/A converter 53 converts to an analog signal a phase comparison error signal $f(\theta)$ output by the phase comparator 52. The loop filter 54 filters out extraneous noises and harmonic components contained in the output signal of the D/A converter 53, and determines a time domain response characteristic and a frequency domain response characteristic. The clock signal CLK from the voltage controlled oscillator 51 is supplied to the A/D converter 33 as a sampling clock signal as well as to the phase comparator 52 as an operation clock signal.

The phase comparator 52 comprises a digital inner product arithmetic unit 61, a D flip-flop 62 and a factor generator 63. The digital inner product arithmetic unit 61 calculates a linear combination of N sampled values and N weighting factors (N is a natural number). The N sampled values are obtained by sampling a reproduced signal z(t) from the clock pattern 13 by use of the clock signal CLK, and the N weighting factors are output by the factor generator 63 (to be described later). (What is calculated here is an inner product of two vectors, one vector being a signal vector having N sampled values acquired by sampling the reproduced signal from the clock pattern 13 using the clock signal CLK, the other vector being a factor vector having N weighting factor.) The D flip-flop 62 latches the result of the inner product calculation by the arithmetic unit 61 involving the signal and factor vectors, and outputs the phase comparison error signal $f(\theta)$. The factor generator 63 outputs as many as N weighting factors.

Figure 8:
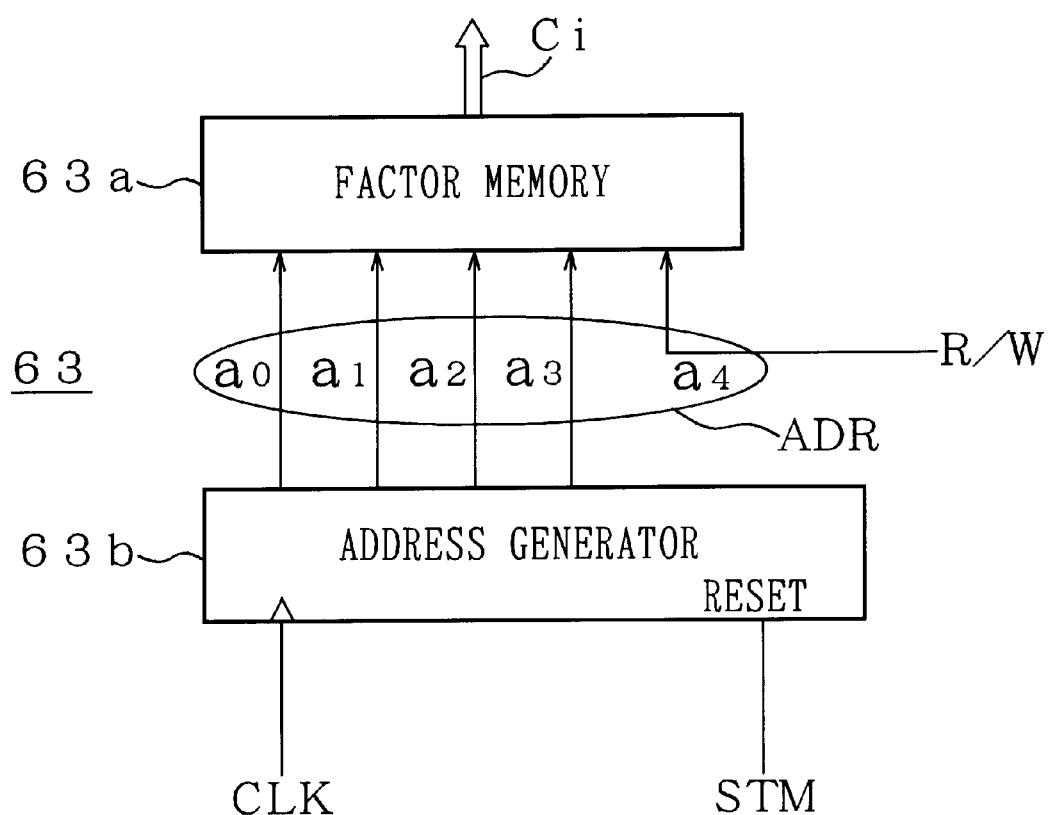
FIG. 8 is a block diagram showing a typical constitution of a factor generator.

FIG. 8 depicts a typical constitution of the factor generator 63. The factor generator 63 comprises a factor memory 63a for storing factors, and an address generator 63b that generates signals ($a_0$, $a_1$, $a_2$, $a_3$) making up the low-order four bits of a five-bit read address signal ADR to be fed to the factor memory 63a. The address generator 63b, reset by a timing signal STM from a PLL controller 64 (to be described later), successively generates the signals ($a_0$, $a_1$, $a_2$, $a_3$) constituting the low-order four bit of the read address signal ADR in synchronism with the clock signal CLK, so that the N weighting factors Ci will be read from the factor memory 63a in synchronism with the reproduced signal from the clock pattern 13.

As described above, the mode signal R/W from the microprocessor 24 is supplied as a signal constituting the most significant bit ($a_4$) of the read address signal ADR. This makes it possible for different N weighting factors Ci to be read from the factor memory 63a for each of read and write operations.

The arithmetic unit 61 comprises a multiplier 71 and an accumulator 72. The multiplier 71 successively multiplies the N elements of the signal vector by the N weighting factors of the factor vector. The accumulator 72, made up of an adder 72a and an accumulator register 72b, adds up the results of multiplication by the multiplier 71. The output side of the multiplier 71 is connected to one input of the adder 72a. The output side of the adder 72a is connected to the input side of the accumulator register 72b. The output side of the register 72b is connected to the other input of the adder 72a.

The phase comparator 52 also includes a PLL controller 64 that provides a timing signal STM, a clear signal SCL and a latch enable signal SLA. The timing signal STM is supplied to the factor generator 63 indicating the start of the output of N weighting factors. The clear signal SCL is fed to the accumulator register 72b constituting part of the arithmetic unit 61. The latch enable signal SLA is given to the D flip-flop 62. The PLL controller 64 is supplied with the unique pattern detection signal UPD from the unique pattern detector 45. Details of the unique pattern are discussed illustratively in Japanese Patent Laid-Open No. Hei 6-290545 (U.S. Pat. No. 5,526,200). It is in reference to the point of time at which the unique pattern 15 is detected that the PLL controller 64 generates the above-described timing signal STM, clear signal SCL and latch enable signal SLA.

Figure 9:
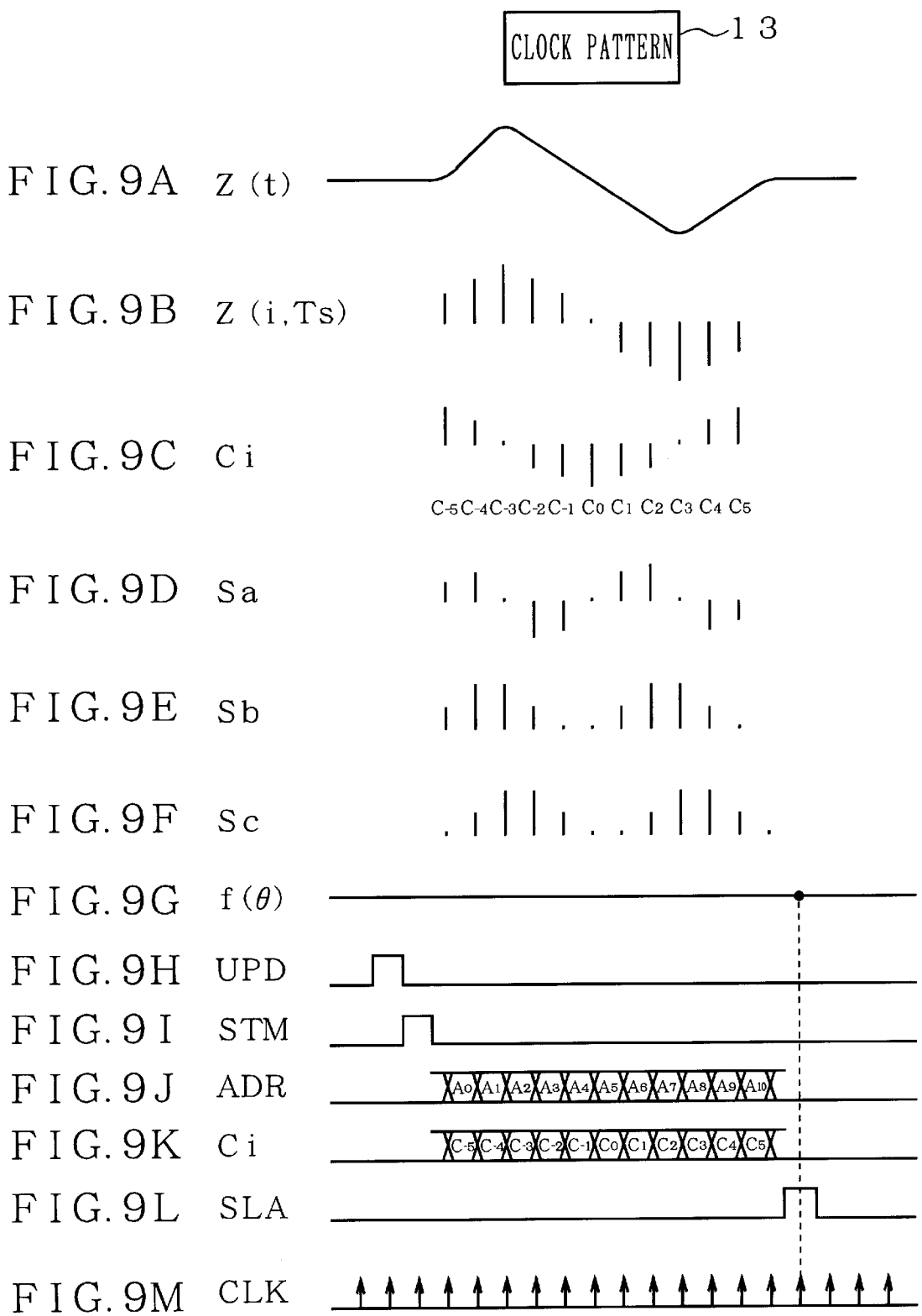
FIGS. 9A through 9M are timing charts illustrating how the clock generator works.

The timing signal STM is output upon elapse of a predetermined period of time defined by a predetermined number of clock pulses counted from the point in time at which the unique pattern 15 is detected (FIGS. 9H and 9I). If the clock signal CLK (FIG. 9M) coincides in phase with a reproduced signal z(t) (FIG. 9A) from the clock pattern 13, the first of the elements constituting the above-described signal vector is sent to the multiplier 71 in the arithmetic unit 61 upon elapse of the predetermined period of time. The latch enable signal SLA (FIG. 9L) is output after the arithmetic unit 61 has finished calculating an inner product of the signal vector and factor vector. The clear signal SCL (not shown in any of FIGS. 9A through 9M) is output following the output of the latch enable signal SLA and before the next round of inner production calculation is started by the arithmetic unit 61.

Below is a description of how the clock generator 46 in FIG. 7 works. The reproduced signal z(t) (FIG. 9A) from the clock pattern 13 is converted to a digital signal by the A/D converter 33 before being supplied to the phase comparator 52. In the phase comparator 52, the digital signal is sent to the digital inner product arithmetic unit 61 that calculates a linear combination, i.e., an inner product of the above-mentioned signal vector and factor vector. Specifically, the reproduced signal z(t) from the clock pattern 13 is sampled by use of the clock signal CLK to produce N sampled values z(i·Ts) (FIG. 9B) which make up the signal vector, while N weighting factors Ci (FIGS. 9C and 9K) are output by the factor generator 63 to form the factor vector. The signal vector and factor vector thus prepared are subjected to inner product calculation. Based on the result of the calculation, the D flip-flop 62 outputs the phase comparison error signal f(θ) (FIG. 9G).

The phase comparison error signal f(θ) is converted to an analog signal by the D/A converter 53. The loop filter 54 removes unnecessary noises and harmonic components from the analog signal and determines the time domain response characteristic and frequency domain response characteristic associated with the signal. The resulting signal is sent to the voltage controlled oscillator 51 as a control signal. Given the control signal, the voltage controlled oscillator 51 controls the phase of its output clock signal CLK. This provides the clock signal CLK in synchronism with the reproduced signal z(t) from the clock pattern 13.

The timing charts of FIGS. 9A through 9M apply when N represents 11 and when the clock signal CLK coincides in phase with the reproduced signal from the clock pattern 13. It follows that the phase comparison error signal f(θ) is zero. FIG. 9D shows an output signal Sa of the multiplier 71, FIG. 9E depicts an output signal Sb of the adder 72a, FIG. 9F illustrates an output signal Sc of the accumulator register 72b, and FIG. 9J indicates the read address signal ADR fed to the factor memory 63a.

As described, the arithmetic unit 61 in the phase comparator 52 calculates a linear combination of the N sampled values z(i·Ts) acquired by sampling the reproduced signal z(t) from the clock pattern 13 using the clock signal CLK, and of the N weighting factors Ci output by the factor generator 63.

For example, when the total number of factors (N) is 11, the arithmetic unit 61 multiplies the successively supplied signal-sampled values z(i·Ts) (i=−5, −4, . . . , 0, . . . , 4, 5) by the respectively corresponding weighting factors Ci (i=−5, −4, . . . , 0, . . . , 4, 5), and accumulates the products. Thus the phase comparison error signal f(θ) is defined by the expression (1) shown below. That is, the error signal expresses the result of phase comparison as a function of a phase error θ between the reproduced signal z(t) from the clock pattern 13 and the clock signal CLK.

$$f(\theta) = \sum_{i=-5}^{5} z(i \cdot Ts - \theta) \cdot Ci \tag{1}$$

where, Ts stands for the sampling time.

A technique has been proposed (illustratively by Japanese Patent Laid-Open No. Hei 8-69668) to attain high levels of precision in phase comparison. The proposed technique involves the use, as weighting factors c(i), of ideal values of the reproduced signal (phase comparison target signal) from the clock pattern 13, i.e., factors c1i equal to sampled values from time differentiated waveforms of noise-free reproduced signals s(t) based on the clock pattern 13, as defined by the expression (2) shown below (the factors c1i will be referred to hereunder as the conventional weighting factors).

$$Cli = \left. \frac{\partial s(t)}{\partial} \right|_{(t = i \cdot Ts)} \tag{2}$$

From another point of view, the linear combination calculation defined by the expression (1) above may be regarded as computations of the inner product of a signal vector Z(θ) and a factor vector C, the signal vector having signal samples z(1·Ts−θ), the factor vector comprising weighting factors "ci." The signal vector Z(θ) is defined by the expression (4) and the factor vector C by the expression (5) below, in which T stands for a transposition.

$$f(\theta) = Z(\theta)^T C \tag{3}$$

$$Z(\theta) = [z(-5Ts - \theta), z(-4Ts - \theta), \ldots, z(I \cdot Ts - \theta), \ldots, z(4Ts - \theta), z(5Ts - \theta)]^T \tag{4}$$

$$C = [c-5, c-4, \ldots, ci, \ldots, c4, c5]^T \tag{5}$$

Figure 10:
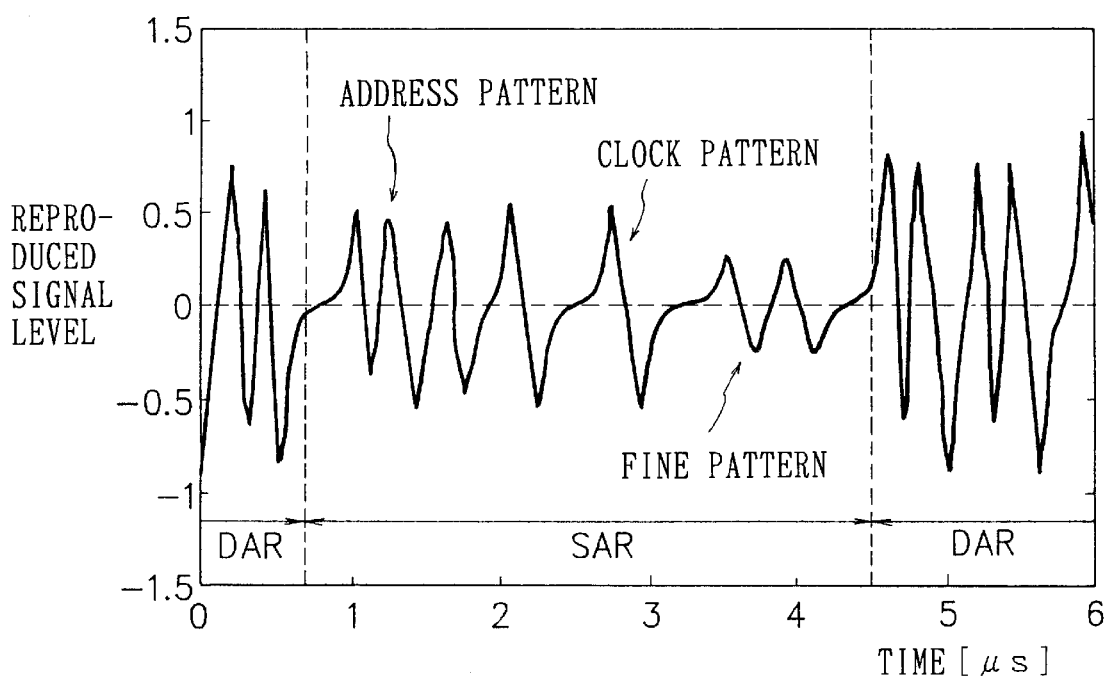
FIG. 10 is a waveform chart of a reproduced signal in data reproduction mode.

When the magnetic disk drive 20 is in data reproduction mode, it reproduces servo information from servo areas SAR and, through servo-based head positioning, concurrently reproduces data from data areas DAR. Because the magnetic head 21 (MR type head 21B) and the head amplifier (reproduction amplifier 31) are constantly engaged in reproducing operations, reproduced signals are output continuously from both the servo areas SAR and the data areas DAR, and the DC component of the reproduced signals remains stable as shown in FIG. 10.

Figure 11:
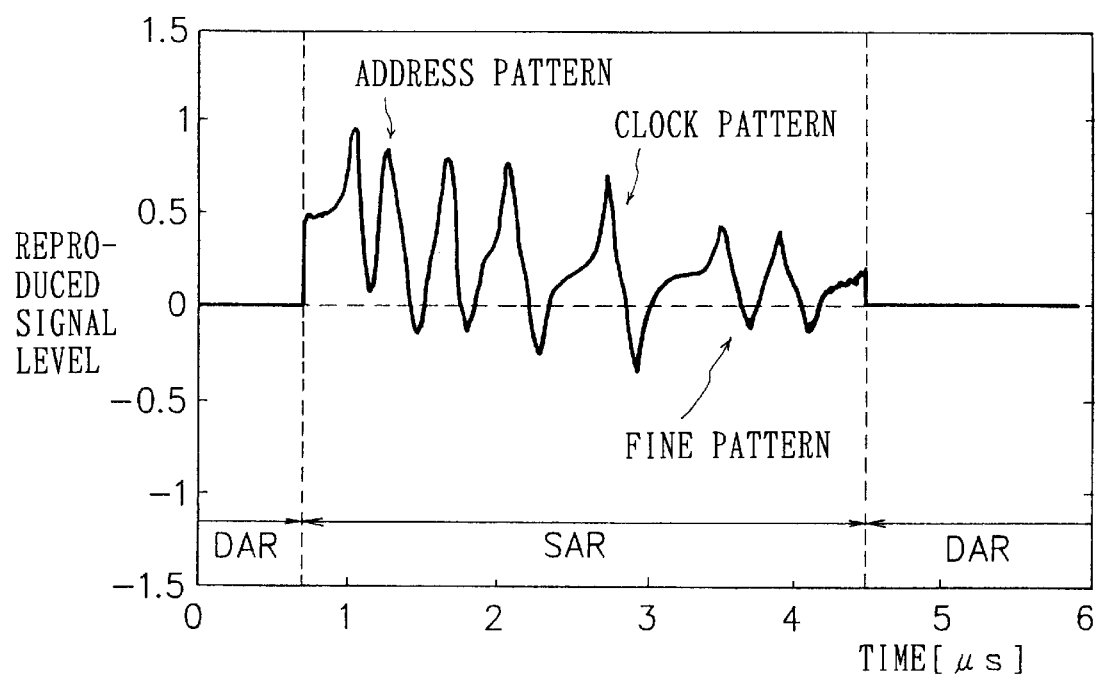
FIG. 11 is a waveform chart of a reproduced signal in data recording mode.

When the magnetic disk drive 20 is in data recording mode, it reproduces servo information from servo areas SAR and, through servo-based head positioning, records data to data areas DAR. This means that every time the magnetic head 21 reaches a servo area SAR, the magnetic head 21 and the head amplifier switch from recording to reproduction. FIG. 11 illustrates a reproduced signal waveform in effect in the proximity of such a switchover. Although it is possible to obtain a reproduced signal representing servo information immediately after the start of a reproducing operation, the DC level of all reproduced signals fluctuates. The phenomenon is known as the base line fluctuation.

The DC level fluctuation is characterized by the fact that the level slowly stabilizes after each switchover and that the time constant representing the velocity of the fluctuation is on the order of several us or greater. There are two major probable causes of the DC level fluctuation, as described below.

First, various currents inside the magnetic head 21 (recording current, sense current, bias current) are turned on and off upon switchover between recording and reproduction. The on-off action changes the heating value in the head, varying the temperature of magneto-resistive effect elements therein. This in turn alters the electrical resistance of the magneto-resistive effect elements, causing the DC level of reproduced signals to fluctuate.

Second, inside the head amplifier IC arrangement containing both a write and a read circuit, the write circuit handling relatively large currents (e.g., of 30 mA) interferes with the read circuit dealing with very low voltages (e.g., 700 $\mu$V to 1 mV, peak to peak). That interference causes the DC level of reproduced signals to fluctuate following a switchover from recording to reproduction.

It is for the purpose of averting adverse effects of the DC fluctuation that the inventive clock generator utilizes, as its weighting factors $c_i$, DC-free factors $c_{2i}$ whose total sum is zero so as to accomplish precise phase comparison with the clock pattern 13.

When the total number of the factors is 11 (=N), the factors $c_{2i}$ can be readily acquired by use of the expression (6) below.

$$C2i = C1i - \sum_{k=-5}^{5} C1k/11, i = -5, -4, \ldots, 0, \ldots, 4, 5 \quad (6)$$

Whether or not the total sum of the factors $c_{2i}$ is zero is ascertained by the expression (7) below.

$$\sum_{i=-5}^{5} C2i = \sum_{i=-5}^{5} \left( C1i - \sum_{k=-5}^{5} C1k/11 \right)$$
$$= \sum_{i=-5}^{5} C1i - 11 \cdot \sum_{k=-5}^{5} C1k/11 = 0 \quad (7)$$

Using the factors $c_{2i}$ leaves the result of the linear combination calculation, i.e., phase comparison error signal $f(\theta)$, unaffected even if the DC component is superposed on reproduced signals from the clock pattern 13. This eventuality may be explained by the expression (8) below. The expression (8) represents a phase comparison error signal $f(\theta)$ in effect when the DC component "d" is superposed on reproduced signals derived from the clock pattern 13.

$$f(\theta) = \Sigma z(i \cdot Ts - \theta) + d) \cdot c2i = (\Sigma z(i \cdot Ts - \theta) \cdot c2i) + (d \cdot \Sigma c2i) \quad (8)$$

The right-hand second term of the expression (8) is zero from the result of the expression (7). This means that, as shown by the expression (9) below, the phase comparison error signal $f(\theta)$ is completely free from the effects of the DC component "d" that may be superposed on the reproduced signal.

$$f(\theta) = \Sigma z(i \cdot Ts - \theta) \cdot c2i \quad (9)$$

Figure 12:
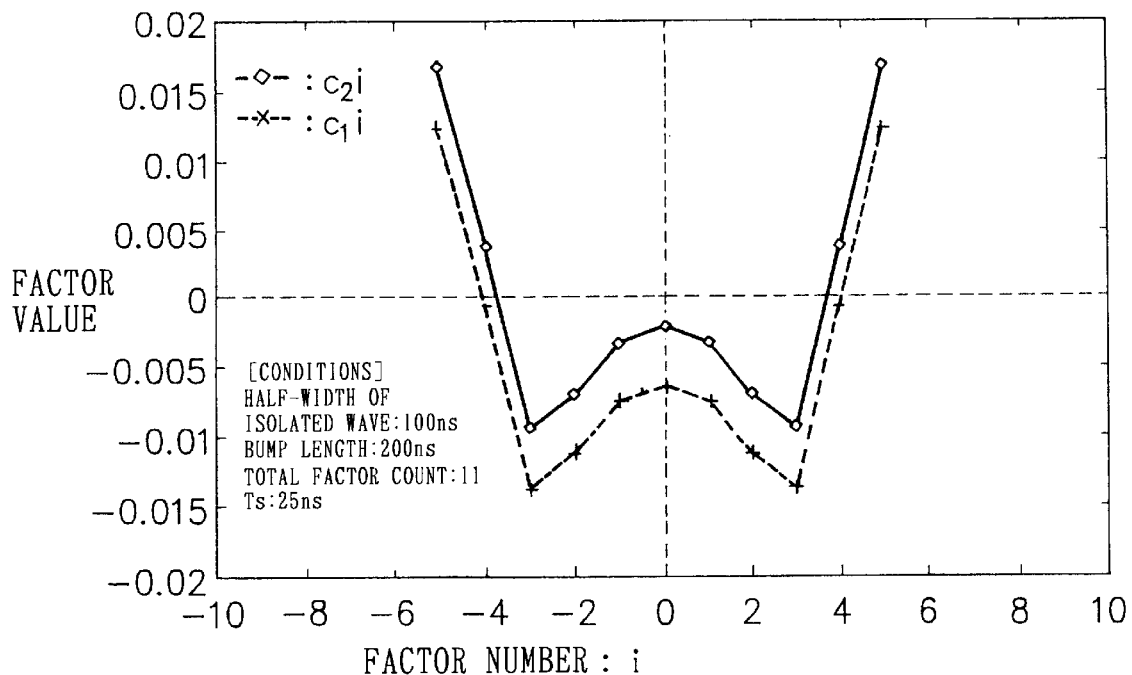
FIG. 12 is a graphic representation comparing typical factors used by a conventional clock generator with those for use by the best mode of the invention (total factor count N=11)
Figure 13:
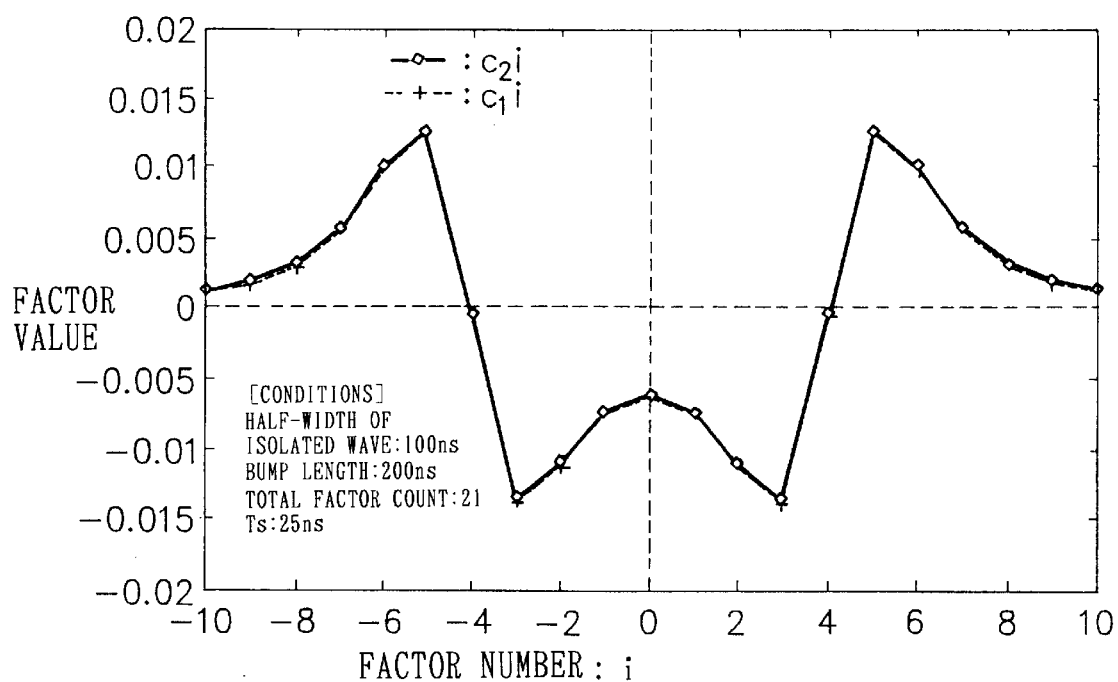
FIG. 13 is another graphic representation comparing typical factors used by the conventional clock generator with those for use by the best mode of the invention (total factor count N=21)

FIGS. 12 and 13 graphically compare weighting factors ($c_i = c_{2i}$) of the inventive clock generator in a write operation with weighting factors $c_{1i}$ of its conventional counterpart (disclosed by Japanese Patent Laid-Open No. Hei 8-69668). Because the reproduced signal z(t) from the clock pattern 13 has no DC fluctuation and remains stable in read operations, the conventional weighting factors $c_{1i}$ maybe used at read time by the embodiment of the invention to implement the above-described maximum likelihood phase comparison.

The weighting factors $c_{1i}$ are obtained by differentiating noise-free reproduced signals s(t) from the clock pattern 13 in accordance with the expression (2) above. Theoretically, if the total number (N) of these factors free from the superposed DC component were infinite, their total sum $\Sigma c_{1i}$ should be zero. In practice, the total number of factors is finite and their total sum $\Sigma c_{1i}$ is other than zero because the factors corresponding to the base of the waveform are not used.

FIG. 12 shows typical weighting factors $c_{1i}$ and $c_{2i}$ used when a linear combination of 11 signal samples (N=11) is calculated. Of the conventional weighting factors $c_{1i}$ acquired by differentiating the noise-free reproduced signals s(t) from the clock pattern 13 as per the expression (2), the factors having the negative polarity are all included in the 11 signal samples. On the other hand, all factors having the positive polarity are distributed extensively in the time domain and are thus excluded from the 11 samples. It follows that, of the 11 factors $c_{1i}$, those with the positive polarity constitute a total sum smaller than the sum of those with the negative polarity. That is, the total sum $\Sigma c_{1i}$ is not zero but a negative value (this also applies in the case of FIG. 13 where N=21).

By contrast, the weighting factors $c_{2i}$ of this invention are arranged so that their total sum $\Sigma c_{2i}$ is zero. That is, the factors are offset slightly more on the positive side than the conventional weighting factors $c_{1i}$.

FIG. 13 likewise shows typical weighting factors $c_{1i}$ and $c_{2i}$ in effect when a linear combination of 21 signal samples (N=21) is calculated. In this example, the factors are extensively distributed in the time domain so that the total sum $\Sigma c_{1i}$ of the conventional weighting factors $c_{1i}$ is fairly close to zero. For that reason, the weighting factors $c_{2i}$ for the embodiment of the invention at write time are those obtained by offsetting the conventional weighting factors $c_{1i}$ slightly on the positive side.

Use of the weighting factors $c_{2i}$ shown in FIGS. 12 and 13 affords the benefits described in conjunction with the expressions (8) and (9) above. This provides a phase comparison error signal $f(\theta)$ free from the adverse effects of the DC component superposed on reproduced signals from the clock pattern 13. As a result, a clock signal CLK synchronized precisely with the reproduced signals from the clock pattern 13 is acquired.

Because reproduction of servo information can be started without waiting for the DC component in a reproduced signal to stabilize completely upon switchover from recording to reproduction, it is possible to reduce significantly the useless areas set aside between data areas DAR and servo areas SAR for DC level stabilization. This in turn makes it possible to increase the data recording density per disk surface and thereby utilize the storage medium effectively.

Figure 14:
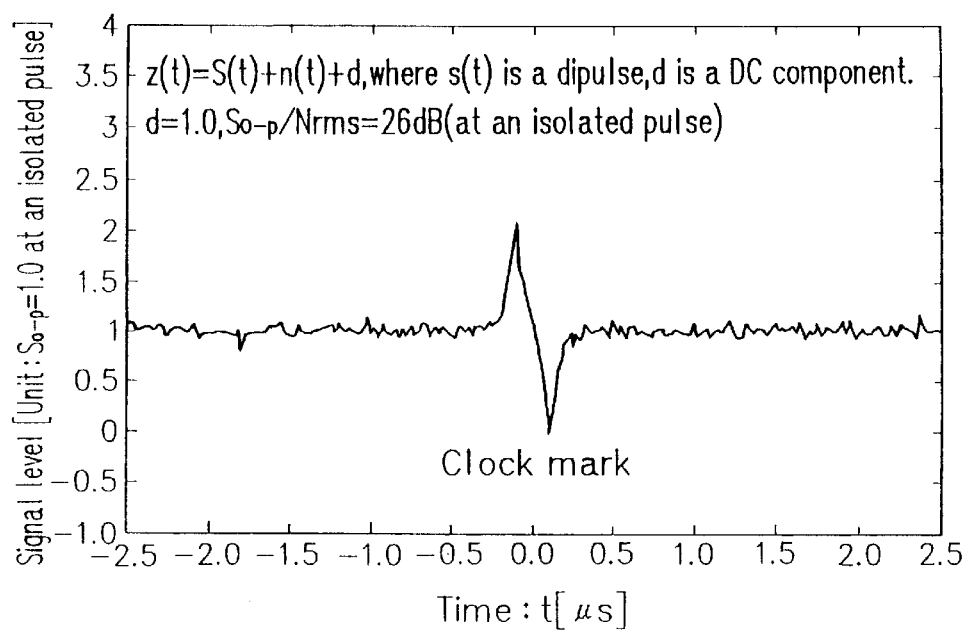
FIG. 14 is a waveform chart of a reproduced signal from a servo area used in simulation.
Figure 15:
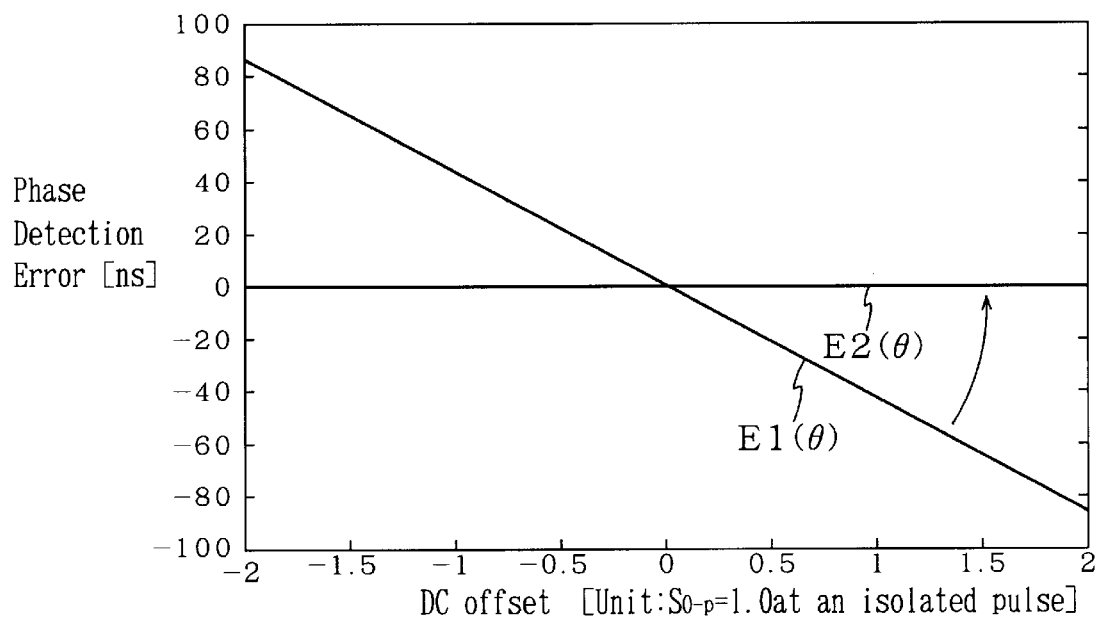
FIG. 15 is a graphic representation showing how a DC component "d" superposed on a reproduced signal from a servo area affects an error.
Figure 16:
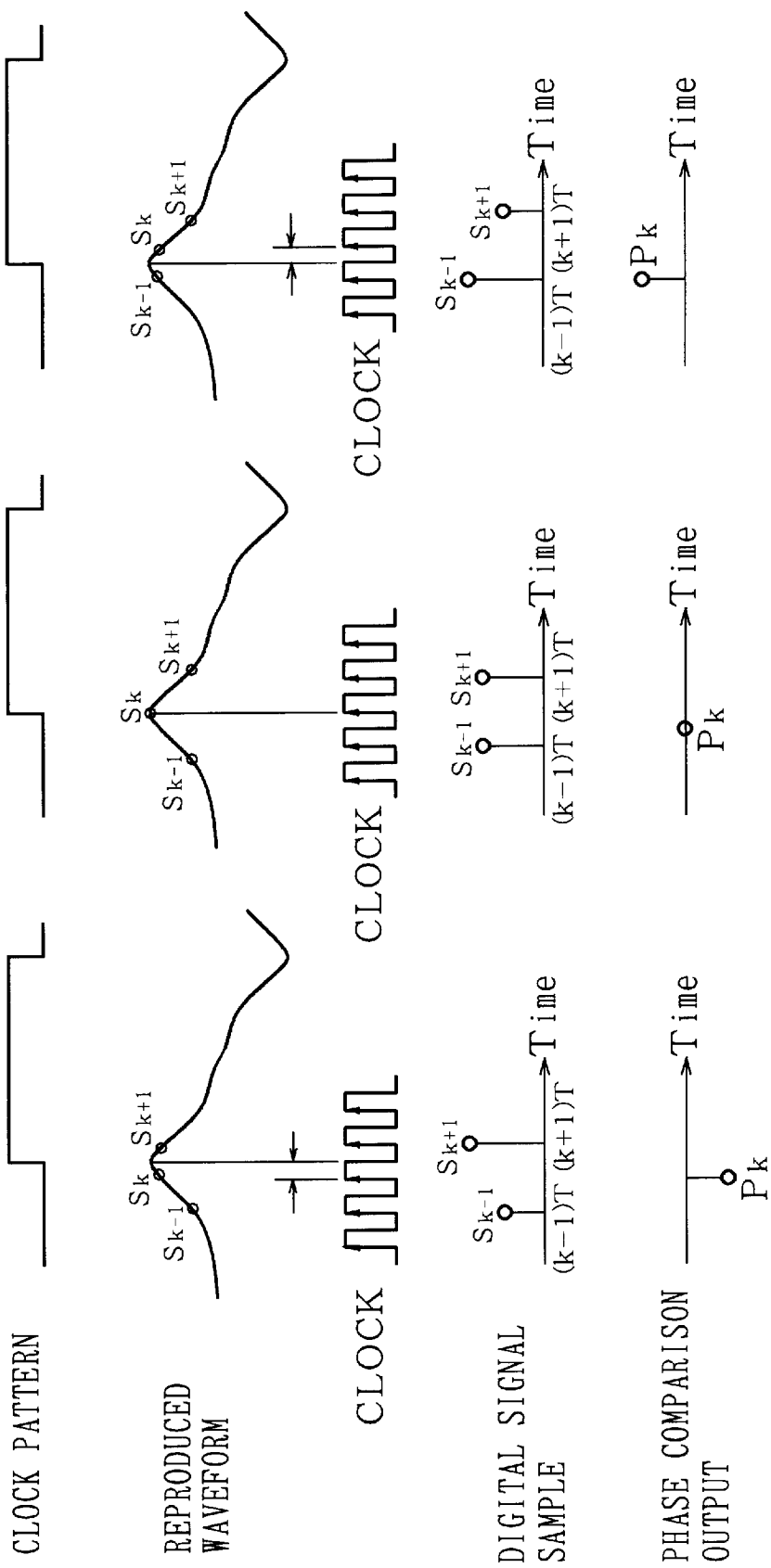
FIGS. 16A, 16B and 16C are waveform charts depicting how a phase comparator disclosed by Japanese Patent Laid-Open No. Hei 6-290545 works.
Figure 17:
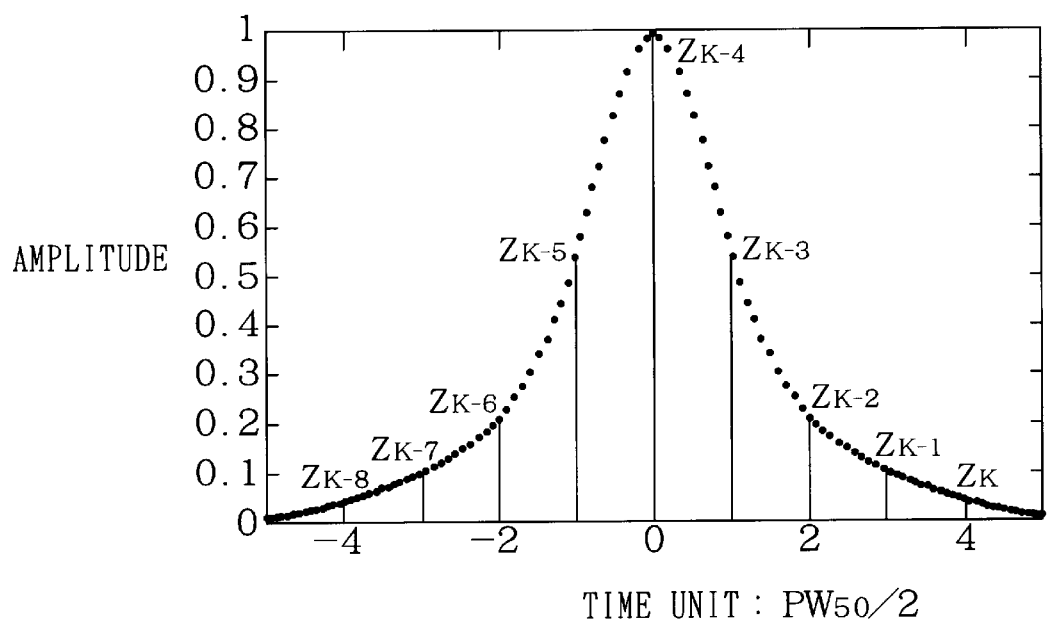
FIGS. 17 and 18 are graphic representations illustrating how a phase comparator disclosed by Japanese Patent Laid-Open No. Hei 8-69668 works.
Figure 18:
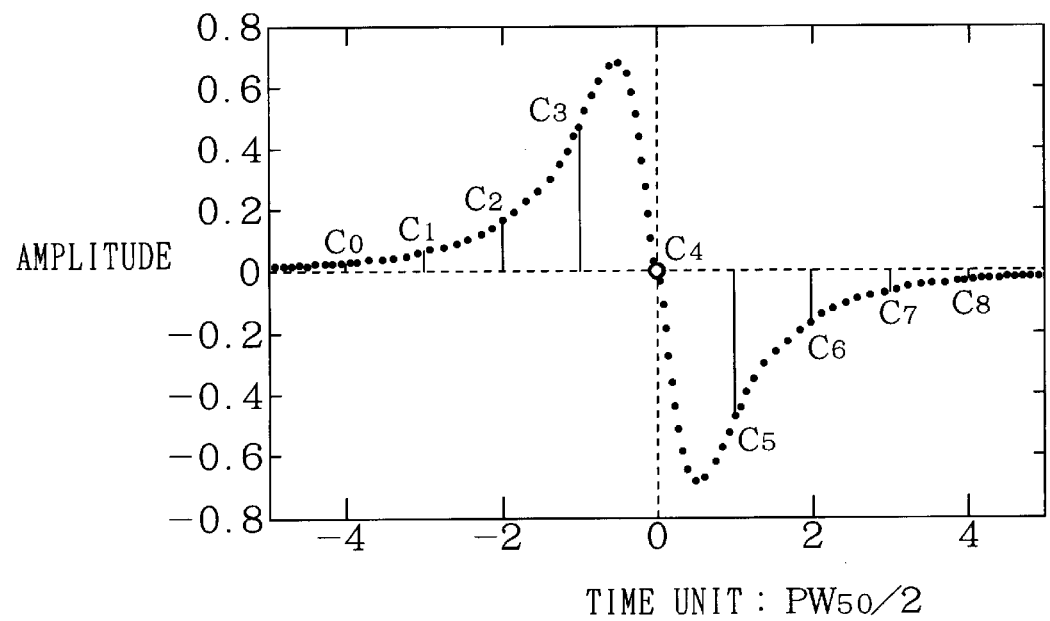

FIGS. 14 and 15 show quantitatively confirmed results of what the invention as embodied above provides in simulation.

FIG. 14 graphically illustrates the reproduced signal z(t) from a servo area SAR used in simulation. This signal is acquired by superposing a DC component stemming from a recording-reproduction switchover onto a dipulse-reproduced signal s(t) from a clock pattern (clock mark) made of a single bump. The signal also has noise n(t) superposed thereon so as to better simulate an actual magnetic disk drive.

During the simulation by the inventors, the following values were used as parameters so as to duly simulate a real magnetic disk drive: the width (bump length) of the clock pattern 13 was 200 ns. Two isolated reproduced waveforms constituting a dipulse was a Lorentz type pulse having a half-width of 100 ns. The noise n(t) was a Gaussian white noise common to magnetic recording and reproducing systems. The mean value of the noise n(t) was zero and its standard deviation Nrms was 1/20 (−26 dB) with respect to a zero-peak value $S_{0-P}$ of the isolated waveforms described above. For statistical analysis of errors in the phase comparison results relative to true values, there were provided 200 reproduced signals z(t) which were identical statistically but which had different noises superposed thereon. These reproduced signals z(t) were fed to the phase comparator 52 (see FIG. 7). The errors in the 200 phase comparison error signals f(θ) relative to the true values were statistically analyzed and a mean value of the errors was obtained. The total number of factors (N) was 11, and the sampling time Ts was 25 ns.

FIG. 15 shows how a DC component superposed on a reproduced signal affects an error. Where the conventional weighting factors C1i are used, the mean value E1(θ) of the errors is inversely proportional to the DC component fluctuation; the weighting factors are affected significantly by the DC component. Where the inventive weighting factors c2i are used, by contrast, the mean value E2 (θ) of the errors is always zero, completely free from the adverse effects of the DC component.

As evident from the result of the simulation above, using the inventive weighting factors c2i virtually averts all adverse effects of the DC component superposed on the reproduced signals z(t) from the clock pattern 13 or of the DC level fluctuation involved. This ensures phase comparison in a highly stabilized and precise manner. With the magnetic disk drive 20 further stabilized in its operation by the inventive weighting factors, the gap between the data areas DAR and the servo areas SAR on the magnetic disk 11 can be made narrower than before. This translates into a wider data domain that promises a higher storage capacity.

Below is a description of how the magnetic disk drive 20 of FIG. 3 works.

The above-mentioned initial synchronism is established immediately after power is applied or following an out-of-phase event. In that case, signals reproduced by the MR type head 21B from the magnetic disk 11 are fed to and amplified by the reproduction amplifier 31. The clock generator 46 generates the clock signal CLK synchronized with those reproduced signals from the clock pattern 13 which are included in the reproduced signals from the servo areas SAR on the magnetic disk 11, as described earlier.

With the initial synchronism thus established, a write or read operation takes place. A write operation is carried out as follows: upon receipt of a write command from the host computer, the microprocessor 24 translates a logical block number in the command into a physical position of the magnetic disk 11 (specified by a head number designating one of multiple heads, by a track number and by a sector number). The translation involves using a translation table held in the ROM 25. The translated physical position allows a target track address and a write start sector to be recognized.

The microprocessor 24 sets target track address (track number) information AD0 to the servo controller 42, and starts a track seek operation. The track seek operation is carried out as follows:

The servo controller 42 compares the target track address with the current track address at which the head 21A or 21B is located as designated by the track address information TAD obtained by the servo information detector 44. Through the comparison, the servo controller 42 causes the VCM driver 41 to control the voice coil motor 22 so as to match the current track address with the target track address. After making the current track address coincide with the target track address, the servo controller 42 causes the VCM driver 41 to control the voice coil motor 22 so that the head 21A or 21B will be positioned to the center of the target track. The centering operation is performed on the basis of the above-mentioned fine position signal TRA acquired by the servo information detector 44. With the head 21A or 21B positioned at the center of the target track, the track seek operation is terminated.

After the track seek operation, the microprocessor 24 refers to a sector ID extracted by the read data processing circuit 36. In reference to the extracted sector ID, the microprocessor 24 gains access to the write start sector, and starts retrieving write data WD from the write data buffer 26 where the data has been held temporarily after being transferred from the host computer. The write data processing circuit 27 prepares recording data by supplementing the write data WD from the write data buffer 26 with an error correcting code and by subjecting the write data to digital modulation. The recording data is write-compensated by the write compensation circuit 28 before being supplied to the recording amplifier 29.

The recording amplifier 29 outputs a recording current signal corresponding to the write data WD. The recording current signal is fed to the inductive type head 21A. The head writes the write data WD sent from the host computer to those sectors on the magnetic disk 11 which are designated by the write command. The sector ID numbers are recorded to the data areas DAR on the magnetic disk 11 at the time of formatting.

Every time the magnetic head 21 reaches a servo area SAR during a write operation, the magnetic head 21 and the head amplifier are switched operationally from recording to reproduction, as described above. The DC level of all reproduced signals fluctuates immediately after the start of a read operation. In this case, as described, the clock generator 46 performs phase comparison by calculating the inner product of a signal vector and a factor vector. The signal vector comprises N sampled values z(i·Ts) obtained by sampling reproduced signals z(t) from the clock pattern 13, and the factor vector has N weighting factors Ci whose total sum $\Sigma c2i$ is zero. The arrangement minimizes any adverse effects, on the results of phase comparison, of the DC level fluctuation in the reproduced signals z(t) from the clock pattern 13. This makes it possible to acquire the clock signal CLK synchronized precisely with the reproduced signals z(t) from the clock pattern 13.

A read operation is carried out as follows: when receiving a read command from the host computer, the microprocessor 24 translates a logical block number in the command into a physical position of the magnetic disk 11 (specified by a head number, a track number and a sector number). The translation involves the use of the translation table stored in the ROM 25. The translated physical position allows a target track address and a read start sector to be recognized.

The microprocessor 24 sets target track address (track number) information AD0 to the servo controller 42, and starts a track seek operation. The track seek operation is carried out in the same manner as in the write operation described above.

In a read operation, signals reproduced by the MR type head 21B from data areas DAR on the magnetic disk 11 are fed to and amplified by the reproduction amplifier 31. The amplified signals are adjusted in level by the variable gain amplifier 32 and digitized by the A/D converter 33. The output signal of the A/D converter 33 is subject to waveform equalization by the equalizer 34. The data detector 35 detects reproduced data from the output signal of the equalizer 34. Reproduced data from the data detector 35 is supplied to the read data processing circuit 36. The read data processing circuit 36 subjects the reproduced data to digital demodulation and error correction, whereby read data RD is obtained.

Upon completion of the track seek operation, the microprocessor 24 refers to a sector ID extracted by the read data processing circuit 36. In reference to the extracted sector ID, the microprocessor 24 gains access to the read start sector. Thereafter, the microprocessor 24 transfers the read data RD output by the read data processing circuit 36 to the host computer via the read data buffer 37. In this manner, the read data RD is acquired from those sectors on the magnetic disk 11 which are designated by the read command. The read data thus acquired is transferred to the host computer.

During the read operation, the magnetic head 21 and head amplifier are held switched operationally to reproduction. There is no DC level fluctuation in the reproduced signals z(t) from the clock pattern 13, and the signals remain stable. For this reason, the clock generator 46 in read operations utilizes as its weighting factors Ci the factors c1i equal to sampled values from time differentiated waveforms of noise-free reproduced signals s(t) based on the clock pattern 13, as described above, whereby maximum likelihood phase comparison is carried out. Obviously, the same weighting factors used in write operations may also be used in read operations.

The embodiment described above obtains the linear combination of a plurality of sampled values necessary for phase comparison by digitally operating on the signal samples acquired by the A/C converter 33. This aspect of the invention also applies to a case in which, as disclosed by Japanese Patent Laid-Open No. Hei 8-69668, analog delay circuits and operation amplifiers calculate linear combinations continuously and have the calculated result sample-held at times given by a sampling pulse generator so as to obtain a phase comparison output. In such a case, the same benefits of the invention are provided when the total sum of gains from the operation amplifiers for weighting is arranged to be zero.

In the above embodiment, the phase comparator 52 is designed to deal with reproduced dipulse waveforms of clock patterns 13 each comprising a single bump. Alternatively, the phase comparator may be arranged to handle reproduced waveforms of clock patterns each having a combination of a plurality of bumps. This alternative is preferred so as to better level out phase comparison errors stemming from medium noise and head noise, thereby further reducing phase comparison output jitters. In that case, too, the total sum of linear combination weighting factors is arranged to be zero so that clock generation is effected in a highly stable fashion free from the DC level fluctuation following each switchover from recording to reproduction.

Furthermore, the invention may also be applied to a phase comparator designed to regard as clock patterns not the dedicated clock patterns 13 but those patterns for other purposes which may be included in the servo areas SAR. This alternative also ensures stable and precise clock generation.

As described, the clock generator according to the invention calculates the inner product of a signal vector and a factor vector in obtaining the results of phase comparison, the signal vector comprising N sampled values acquired by sampling a phase comparison target signal at suitable sampling intervals, the factor vector including N weighting factors whose total sum is substantially zero. The inventive clock generator minimizes any adverse effects of the DC level fluctuation in the phase comparison target signal on the outcome of phase comparison, thereby providing a clock signal in precise synchronism with the phase comparison target signal.

Equipped with the above clock generator, the disk drive according to the invention can start reproducing servo information immediately after switchover from recording to reproduction without waiting for the DC component in reproduced signals to stabilize. This allows the inventive disk drive significantly to reduce useless areas to be furnished between data and servo areas for DC level stabilization, whereby the data storage capacity per disk surface is enhanced.

INDUSTRIAL APPLICABILITY

As described, the clock generator according to the invention and the related devices may be adapted advantageously to diverse kinds of apparatuses including sample servo type magnetic disk drives.

What is claimed is:

1. A clock generator comprising:
   clock signal generating means for generating a clock signal;
   sampling means for sampling a phase comparison target signal which is supplied at predetermined timing intervals and which has a first period, in accordance with said clock signal during every second period shorter than said first period, in order to output N sampled values during said first period, N being a natural number;
   inner product calculating means for calculating an inner product of a signal vector comprising said N sampled values and a factor vector having N weighting factors, so as to output an outcome of the calculation as a phase comparison signal;
   phase control means for controlling said clock signal generating means based on said phase comparison signal so that said phase comparison target signal and said clock signal will match in phase;
   wherein the total sum of said N sampled values is substantially zero; and
   control means for switching said N weighting factors for said inner product calculating means to different values between a reproduction mode and a recording mode of the disk drive.

2. A clock generator according to claim 1, wherein said inner product calculating means includes a multiplier, an adder and a register.

3. A clock generator according to claim 1, wherein said phase comparison target signal has, during said first period, a first maximum value and a second maximum value differing in polarity from said first maximum value.

4. A disk drive for driving a disk type storage medium on which a reference pattern for clock signal generation is recorded predetermined distances apart, said disk drive comprising:
   access means for reproducing a signal recorded on said disk type storage medium in order to output a reproduced signal;

clock signal generating means for generating a clock signal;

sampling means for sampling a reproduced signal from said reference pattern which is included in each of predetermined timing intervals and which has a first period, in accordance with said clock signal during a second period shorter than said first period, in order to output N sampled values, N being a natural number;

inner product calculating means for calculating an inner product of a signal vector comprising said N sampled values and a factor vector having N weighting factors, so as to output an outcome of the calculation as a phase comparison signal;

phase control means for controlling said clock signal generating means based on said phase comparison signal so that said reproduced signal from said reference pattern and said clock signal will match in phase; and factor generator means for generating said N weighting factors in synchronism with the reproduced signal from the clock signal, said factor generating means including control means for switching said N weighting factors for said inner product calculating means to different values between a reproduction mode and a recording mode;

wherein the total sum of said N sampled values for said inner product calculating means is substantially zero.

5. A disk drive according to claim 4, wherein said inner product calculating means includes a multiplier, an adder and a register.

6. A disk drive according to claim 4, wherein said reproduced signal from said reference pattern has, during said first period, a first maximum value and a second maximum value differing in polarity from said first maximum value.

7. A disk drive according to claim 4, further comprising control means for switching between reproduction mode and recording mode;

wherein said access means reproduces said reference pattern and an information signal from said disk type storage medium in said reproduction mode, and reproduces said reference pattern from said disk type storage medium and records an information signal to said disk type storage medium in said recording mode; and wherein, at least in said recording mode, the total sum of said N weighting factors for said inner product calculating means is substantially zero.

8. A disk drive according to claim 4, wherein said disk type storage medium is a magnetic disk.

9. A disk drive according to claim 4, wherein said factor generator means comprises a factor memory for storing factors, an address generator for generating read address signals in synchronism with the clock signal, so that the N weighting factors are read from the factor memory in synchronism with the reproduced signal.

10. A disk drive for driving a disk type storage medium on which a reference pattern for clock signal generation is recorded predetermined distances apart, said disk drive comprising:

access means for reproducing a signal recorded on said disk type storage medium in order to output a reproduced signal;

clock signal generating means for generating a clock signal;

sampling means for sampling a reproduced signal from said reference pattern which is included in each of predetermined timing intervals and which has a first period, in accordance with said clock signal during a second period shorter than said first period, in order to output N sampled values, N being a natural number;

inner product calculating means for calculating an inner product of a signal vector comprising said N sampled values and a factor vector having N weighting factors, so as to output an outcome of the calculating as a phase comparison signal;

phase control means for controlling said clock signal generating means based on said phase comparison signal so that said reproduced signal from said reference pattern and said clock signal will match in phase;

wherein the total sum of said N sampled values for said inner product calculating means is substantially zero; and control means for switching said N weighting factors for said inner product calculating means to different values between reproduction mode and recording mode;

wherein said access means reproduces said reference pattern and an information signal from said disk type storage medium in said reproduction mode, and reproduces said reference pattern from said disk type storage medium and records an information signal to said disk type storage medium in said recording mode;

wherein, at least in said recording mode, the total sum of said N weighting factors for said inner product calculating means is substantially zero.

11. A disk drive according to claim 10, wherein said disk type storage medium is a magnetic disk.

* * * * *

UNITED STATES PATENT AND TRADEMARK OFFICE
CERTIFICATE OF CORRECTION

PATENT NO.      : 6,226,139 B1
DATED           : May 1, 2001
INVENTOR(S)     : Hiroaki Yada It is certified that error appears in the above-identified patent and that said Letters Patent is hereby corrected as shown below:

Column 16,
Line 29, insert -- of a disk drive -- between "generator" and "comprising"

Signed and Sealed this

Twenty-fifth Day of June, 2002

Attest:

Attesting Officer

JAMES E. ROGAN
Director of the United States Patent and Trademark Office